(12) United States Patent
Zhang et al.

(10) Patent No.: US 12,368,159 B2
(45) Date of Patent: Jul. 22, 2025

(54) PARTICLES COMPRISING SILICON AND LITHIUM

(71) Applicant: Albemarle Corporation, Charlotte, NC (US)

(72) Inventors: Yinzhi Zhang, Charlotte, NC (US); Zhong Tang, Charlotte, NC (US)

(73) Assignee: ALBEMARLE CORPORATION, Charlotte, NC (US)

( * ) Notice: Subject to any disclaimer, the term of this patent is extended or adjusted under 35 U.S.C. 154(b) by 1003 days.

(21) Appl. No.: 17/281,334

(22) PCT Filed: Oct. 11, 2019

(86) PCT No.: PCT/US2019/055980
§ 371 (c)(1),
(2) Date: Mar. 30, 2021

(87) PCT Pub. No.: WO2020/077296
PCT Pub. Date: Apr. 16, 2020

(65) Prior Publication Data
US 2021/0399288 A1    Dec. 23, 2021

Related U.S. Application Data

(60) Provisional application No. 62/744,832, filed on Oct. 12, 2018.

(51) Int. Cl.
*H01M 4/00* (2006.01)
*H01M 4/36* (2006.01)
(Continued)

(52) U.S. Cl.
CPC .......... *H01M 4/366* (2013.01); *H01M 4/364* (2013.01); *H01M 4/386* (2013.01);
(Continued)

(58) Field of Classification Search
CPC .......... H01M 4/485; H01M 4/48; H01M 4/36; H01M 4/1395; Y02E 60/10
See application file for complete search history.

(56) References Cited

U.S. PATENT DOCUMENTS 5,385,111 A    1/1995    Schulze
5,935,246 A    8/1999    Benson
(Continued)

FOREIGN PATENT DOCUMENTS

CN    104603993 A    5/2015
CN    106816594 A    6/2017
(Continued)

OTHER PUBLICATIONS

Kusagawa et al., Non-Aqueous Electrolyte Secondary Battery, Sep. 2016, See the Abstract. (Year: 2016).*
(Continued)

*Primary Examiner* — Anca Eoff
*Assistant Examiner* — Monique M Wills
(74) *Attorney, Agent, or Firm* — KDW Firm PLLC

(57) ABSTRACT

This invention provides compositions comprising coated particles comprising silicon in which the coating is comprised of carbon and one or more lithium silicates, the coated particles comprising silicon having a carbon content of about 0.10 wt % or more and a lithium content of about 1 wt % or more, relative to the total weight of the coated particle. Processes for preparing these compositions are also provided.

3 Claims, 2 Drawing Sheets

(51) Int. Cl.
*H01M 4/38* (2006.01)
*H01M 4/58* (2010.01)
*H01M 4/587* (2010.01)
*H01M 10/0525* (2010.01)
*H01M 4/02* (2006.01)

(52) U.S. Cl.
CPC ......... *H01M 4/5825* (2013.01); *H01M 4/587* (2013.01); *H01M 10/0525* (2013.01); *H01M 2004/021* (2013.01); *H01M 2004/027* (2013.01)

(56) References Cited

U.S. PATENT DOCUMENTS

| | | |
|---|---|---|
| 5,977,831 A | 11/1999 | Davis et al. |
| 6,416,214 B2 | 7/2002 | Forslund et al. |
| 6,509,124 B1 | 1/2003 | Noguchi et al. |
| 7,358,011 B2 | 4/2008 | Fukuoka et al. |
| 8,889,294 B2 | 11/2014 | Kawada |
| 9,136,525 B2 | 9/2015 | Yamamura |
| 9,147,876 B2 | 9/2015 | Satake et al. |
| 9,315,882 B2 | 4/2016 | Lee et al. |
| 9,548,165 B2 | 1/2017 | Fujii et al. |
| 9,627,681 B2 | 4/2017 | Kang et al. |
| 9,735,425 B2 | 8/2017 | Matus et al. |
| 9,859,554 B2 | 1/2018 | Xiao et al. |
| 9,879,344 B2 | 1/2018 | Lee et al. |
| 9,972,836 B2 | 5/2018 | Yang et al. |
| 9,997,772 B2 | 6/2018 | Niimi et al. |
| 10,199,643 B2 | 2/2019 | Zhou et al. |
| 10,396,351 B2 | 8/2019 | Kamo et al. |
| 2015/0086870 A1 | 3/2015 | Fukasawa et al. |
| 2015/0221950 A1 | 8/2015 | Minami et al. |
| 2015/0263340 A1 | 9/2015 | Gonzalez |
| 2015/0280223 A1 | 10/2015 | Chang et al. |
| 2016/0118652 A1 | 4/2016 | Wu et al. |
| 2017/0104210 A1 | 4/2017 | Shin et al. |
| 2017/0117535 A1 | 4/2017 | Yoon et al. |
| 2017/0214041 A1 | 7/2017 | Minami et al. |
| 2018/0040884 A1 | 2/2018 | Kawada |
| 2018/0261833 A1 | 9/2018 | Hirose et al. |
| 2018/0269483 A1 | 9/2018 | Cho |
| 2019/0044128 A1 | 2/2019 | McKinney et al. |
| 2020/0112019 A1 | 4/2020 | Oh et al. |

FOREIGN PATENT DOCUMENTS

| | | | |
|---|---|---|---|
| CN | 107579239 A | | 1/2018 |
| CN | 107887587 A * | 4/2018 | ........ H01M 10/0525 |
| CN | 108232145 A | | 6/2018 |
| CN | 108461723 A | | 8/2018 |
| EP | 3343678 A1 | | 9/2017 |
| JP | 2011222151 A | | 11/2011 |
| JP | 2014220216 A | | 11/2014 |
| JP | 2015060776 A * | 3/2015 | ........... H01M 4/131 |
| JP | 2016506035 A | | 2/2016 |
| JP | 2016219408 A | | 12/2016 |
| JP | 2017216233 A | | 12/2017 |
| JP | 2019501977 A | | 1/2019 |
| JP | 2019043821 A | | 3/2019 |
| WO | WO-2015145521 A1 * | 10/2015 | .......... H01M 10/052 |
| WO | WO-2016147564 A1 * | 9/2016 | ........ H01M 10/0431 |
| WO | WO-2017145654 A1 * | 8/2017 | ............. C01B 25/28 |
| WO | 2019080346 A1 | | 5/2019 |
| WO | 2019112390 A1 | | 6/2019 |

OTHER PUBLICATIONS

Hirose et al, Negative Electrode Active Material for Nonaqueous Electrolyte Secondary Batteries, Nonaqueous Electrolyte Secondary Battery, and Method for Producing Negative Electrode Material for Nonaqueous Electrolyte Secondary Batteries, Aug. 2017, See the Abstract. (Year: 2017).*

Guo et al., Lithium Ion Battery Composite Cathode Material And Preparation Method Thereof, Apr. 2018, See the Abstract. (Year: 2018).*

Essaki et al., Negative Electrode Active Material for Non-Aqueous Electrolyte Cell, Negative Electrode for Non-Aqueous Electrolyte Secondary Cell, Non-Aqueous Electrolyte Secondary Cell, and Cell Pack, Oct. 2015, See the Abstract. (Year: 2015).*

Fukazawa et al., Negative Electrode Material for Nonaqueous Electrolyte Secondary Battery, Negative Electrode for Nonaqueous Electrolyte Secondary Battery, Nonaqueous Electrolyte Secondary Battery, and Battery Pack, Mar. 2015, See the Abstract. (Year: 2015).*

Fukazawa et al., Negative Electrode Material for Nonaqueous Electrolyte Secondary Battery, Negative Electrode for Nonaqueous Electrolyte Secondary Battery, Nonaqueous Electrolyte Secondary Battery, and Battery Pack, Mar. 2015, See the Abstract. (Year: 2015) Google Translation.*

Qing, Ai et al., "Synergistic Double-Shell Coating of Graphene and $Li_4SiO_4$ on Silicon for High Performance Lithium-ion Battery Application," Diamond & Related Materials, 2018, 88, pp. 60-66.

Masafumi Arakawa, "Introduction to Particle Size Measurement," Journal of Society of Powder Technology, Japan, 1980, vol. 17, Issue 6, pp. 299-307, Jun. 10, 1980.

* cited by examiner

PARTICLES COMPRISING SILICON AND LITHIUM

REFERENCE TO RELATED APPLICATIONS

This application is the National Stage of International Patent Application No. PCT/US2019/055980, filed on Oct. 11, 2019, which application claims priority from U.S. Provisional Patent Application No. 62/744,832, filed Oct. 12, 2018, the disclosures of which are incorporated herein by reference.

TECHNICAL FIELD

This invention relates to particles comprising silicon and/or silicon oxides that are coated with a layer comprising carbon and lithium silicates.

BACKGROUND

Silicon oxides are often used in lithium-ion batteries as an anode (negative electrode) active material to improve the energy density of the battery. In the first cycle of a lithium ion battery, irreversible loss of the active lithium is believed to be caused by side reactions of the silicon oxides with lithium to form lithium silicates, which is an irreversible loss of some of the lithium from the cathode and the electrolyte.

To inhibit the irreversible reactions that form lithium compounds that do not contribute to the charging-discharging, and improve the initial charge-discharge efficiency, lithium doping of the silicon oxides, which forms lithium silicates in the silicon oxides, has been investigated. Known methods for lithium doping of silicon oxides generally involve two steps, and often require an inert atmosphere.

SUMMARY OF THE INVENTION

This invention provides particles comprising silicon having a coating comprising carbon and lithium silicates where the particles comprising silicon are usually silicon particles and/or particles comprising one or more silicon oxides, or mixtures of silicon particles and particles comprising one or more silicon oxides. The particles comprising one or more silicon oxides often comprise some elemental silicon; the silicon particles often comprise a small amount of one or more silicon oxides. Advantageously, the coating can be formed on the particles in one step, and the coating is believed to be substantially uniform.

An embodiment of this invention is a composition comprising coated particles comprising silicon in which the coating is comprised of carbon and one or more lithium silicates. The coated particles comprising silicon have a carbon content of about 0.10 wt % or more and a lithium content of about 1 wt % or more, relative to the total weight of the coated particle comprising silicon.

Another embodiment of this invention is a process for forming a composition comprising particles comprising silicon having thereon a coating comprised of carbon and one or more lithium silicates. The coated particles comprising silicon have a carbon content of about 0.10 wt % or more and a lithium content of about 1 wt % or more, relative to the total weight of the coated particle comprising silicon. The process comprises combining and mixing particles comprising silicon and a precursor mixture comprising a liquid medium, a carbon precursor, and a lithium precursor, to form a wetted mixture, and heating at least a portion of the wetted mixture to form the coating on the particles comprising silicon.

These and other embodiments and features of this invention will be further apparent from the ensuing description, drawings, and appended claims.

FURTHER DETAILED DESCRIPTION OF THE INVENTION

Figure 1:
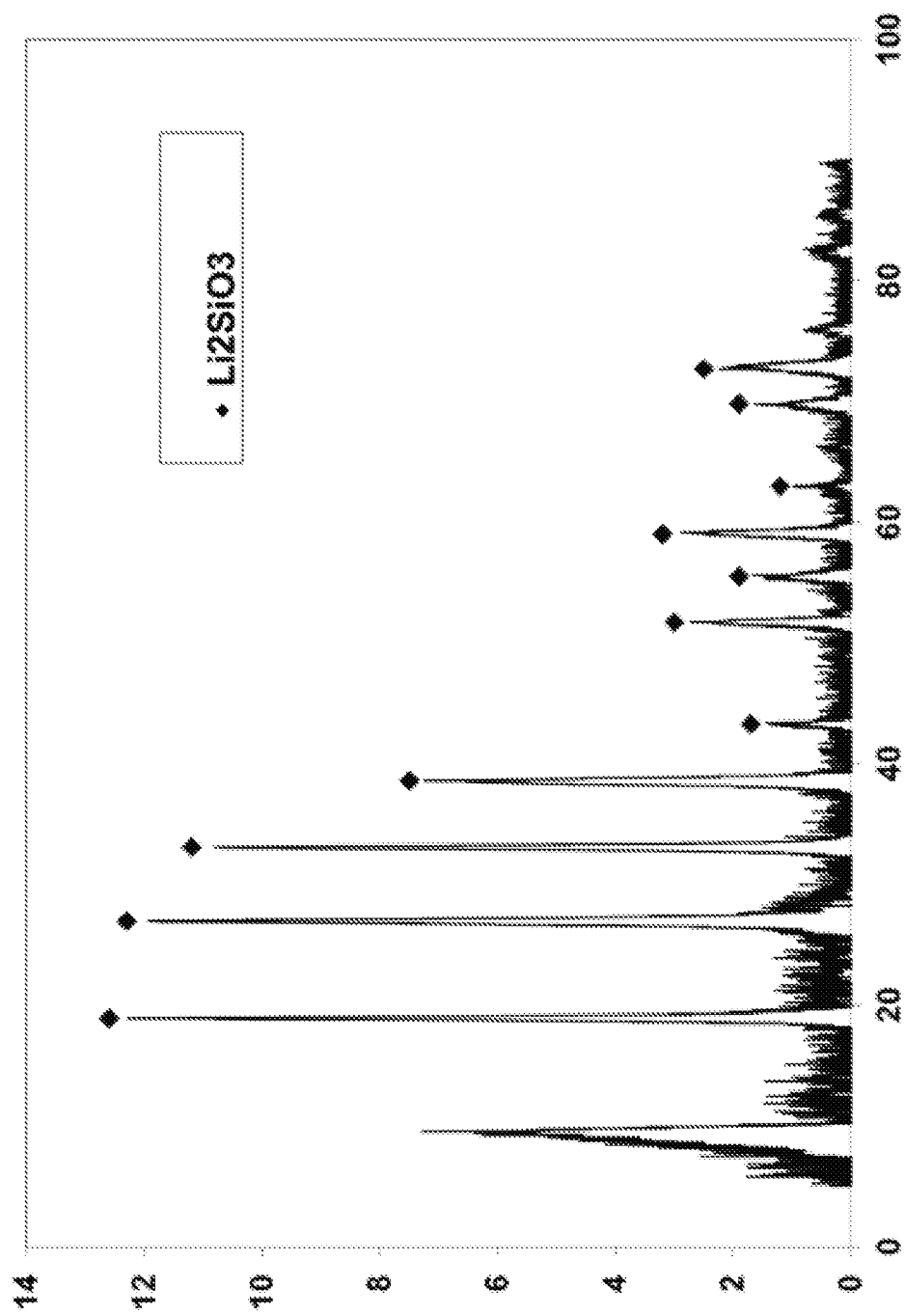
FIG. 1 is a powder XRD pattern for coated particles comprising silicon prepared as in Example 1.

As used throughout this document, the word "layer" has the same meaning as the word "coating." Each term "layer" and "coating" as used in relation to a particle comprising silicon indicates that at least a portion of the surface of such particle, preferable substantially all, or all, of the surface of such particle, is covered by or in contact with the "layer" or "coating". Similarly, the term "coated" in relation to a particle comprising silicon indicates that at least a portion of the surface of the particle, preferable substantially all, or all, of the surface of the particle, is covered by or in contact with the substance(s) with which the particle is said to be "coated." Also, the phrase "coated particle" is used interchangeably with the phrase "coated particle comprising silicon" throughout this document.

The compositions of the invention are believed to have a core-shell structure, in which the shell is the coating or layer comprising the carbon and the lithium silicates, and the silicon and/or silicon oxide(s), which are generally noncrystalline, are the core. The silicon and/or silicon oxide(s) of the core are sometimes referred to as bulk silicon or bulk silicon oxide, respectively.

The phrase "silicon oxide particles" is used interchangeably with the phrase "particles of one or more silicon oxides" throughout this document.

The compositions of the invention are coated particles comprising silicon which generally have an average particle size of about 0.005 micron or more, preferably about 0.05 micron or more. Usually, the coated particles have an average particle size of about 0.05 micron to about 25 microns; preferably, the average particle size is about 0.1 micron to about 20 microns, more preferably about 0.1 micron to about 15 microns, and even more preferably about 1 micron to about 15 microns.

The coated particles are particles comprising silicon, which particles are comprised of silicon and/or one or more silicon oxides. When the particles are comprised of silicon, the particles typically comprise about 95% or more silicon, preferably about 99% or more silicon, neglecting impurities, where impurities are defined as elements other than silicon and oxygen, because silicon particles often comprise a small amount of one or more silicon oxides.

When the coated particles are comprised of one or more silicon oxides, the silicon oxides in the coated particles are of the general formula $SiO_x$, where x is about 0.75 to about 2.0; preferably x is about 0.9 to about 1.8, more preferably about 0.9 to about 1.5. The silicon oxide can comprise SiO and/or $SiO_2$. Preferably, the silicon oxide comprises SiO; more preferably the silicon oxide is SiO. The silicon oxide particles typically comprise about 95% or more silicon oxides, preferably about 99% or more silicon oxides, neglecting impurities, where impurities are defined as elements other than silicon and oxygen. Particles comprising one or more silicon oxides often comprise some elemental silicon.

The coating of the coated particle comprising silicon is comprised of lithium silicates and carbon. The carbon content of the coated particle is about 0.10 wt % or more, preferably in the range of about 0.10 wt % to about 10.0 wt %, more preferably in the range of about 0.10 wt % to about 8.0 wt %, even more preferably about 0.10 wt % to about 5 wt %, relative to the total weight of the coated particle. In the coating, the carbon is usually noncrystalline.

In the coated particle, lithium normally is in the form of lithium silicates. The lithium silicates in the coating can be represented by the formula $Li_aSi_bO_c$, in which a is about 2 to about 8, b is about 1 to about 3, and c is about 3 to about 7. Typically, the lithium silicates formed are $Li_2SiO_3$, $Li_2Si_2O_5$, $Li_4SiO_4$, $Li_8SiO_6$, $Li_6Si_2O_7$, $Li_2Si_3O_7$, or mixtures thereof. In some embodiments, the lithium silicate is $Li_2SiO_3$, $Li_2Si_2O_5$, or mixtures thereof.

The lithium silicates in the coating normally have some crystallinity, which allows the particular lithium silicates to be probed by X-ray powder diffraction (XRD), and are typically identified by their characteristic peaks for the (111) plane. For example, $Li_2SiO_3$ is identified by a peak at $2\theta=27°$ corresponding to the (111) plane of $Li_2SiO_3$. $Li_2Si_2O_5$ is identified by a peak at $2\theta=24.7°$ corresponding to the (111) plane of $Li_2Si_2O_5$. $Li_4SiO_4$ is identified by a peak at $2\theta=28.3°$ corresponding to the (111) plane of $Li_4SiO_4$.

The amount of lithium silicates in the coated particle is such that the lithium content of the coated particle is about 1 wt % or more relative to the total weight of the coated particle. Typically, the lithium content is about 1 wt % to about 15 wt %, preferably about 1 wt % to about 12.5 wt %, more preferably about 1 wt % to about 10 wt %, even more preferably about 1.5 wt % to about 8 wt %, still more preferably about 1.5 wt % to about 5 wt %, relative to the total weight of the coated particle.

In the coated particle, the relative amount of lithium to carbon is typically about 2:1 to about 50:1 by weight, preferably about 3:1 to about 35:1 by weight, more preferably about 3:1 to about 25:1 by weight, even more preferably about 3:1 to about 16:1 by weight.

In the processes of the invention, a precursor mixture comprising a liquid medium, a carbon precursor, and a lithium precursor are combined and mixed with particles comprising silicon to form a wetted mixture, which wetted mixture is heated to form a coating on the particles comprising silicon.

The particles comprising silicon are comprised either of silicon or of one or more silicon oxides. Average particle sizes of the particles comprising silicon and preferences therefor are as described above for the coated particles.

Normally, the particles comprising silicon that are comprised of silicon have a surface comprised of silicon oxides from reaction of the silicon atoms on the particle surfaces with oxygen from the air. The silicon particles typically comprise about 95% or more silicon, preferably about 99% or more silicon when the particle comprising silicon is comprised of silicon, neglecting impurities, where impurities are defined as elements other than silicon and oxygen, because silicon particles often comprise a small amount of one or more silicon oxides.

When the particles comprising silicon are comprised of one or more silicon oxides, the silicon oxides are of the general formula $SiO_x$, where x is about 0.75 to about 2.0; preferably x is about 0.9 to about 1.8, more preferably about 0.9 to about 1.5. The silicon oxide can comprise SiO and/or $SiO_2$. Preferably, the silicon oxide comprises SiO; more preferably the silicon oxide is SiO. Mixtures of different silicon oxides can be used; the mixtures can be comprised of different silicon oxides in separate particles, or particles in which different silicon oxides are present in the same particle. The silicon oxide particles typically comprise about 95% or more silicon oxides, preferably about 99% or more silicon oxides, neglecting impurities, where impurities are defined as elements other than silicon and oxygen.

Mixtures of silicon particles and particles comprised of one or more silicon oxides can be used in the practice of this invention.

In the practice of this invention, the particles comprising silicon generally have a purity of about 95% or more, preferably about 98% or more, and more preferably about 99% or more.

In the practice of this invention, the particles comprising silicon can be particles comprising silicon that have been subjected to a surface treatment (e.g., with a surfactant or by carbonization). Similarly, the particles comprising silicon can be particles comprising silicon that have been oxidized.

In some of the processes of this invention for forming a composition comprising particles comprising silicon having thereon a coating comprised of carbon and one or more lithium silicates in which the coated particles comprising silicon have a carbon content of about 0.10 wt % or more and a lithium content of about 1 wt % or more, relative to the total weight of the coated particle comprising silicon, the processes comprise a) combining and mixing particles comprising silicon and a precursor mixture comprising a liquid medium, a carbon precursor, and a lithium precursor, to form a wetted mixture, and b) heating at least a portion of the wetted mixture to form the coating on the particles comprising silicon.

In the practice of this invention, the lithium precursor is often a lithium compound, typically an inorganic lithium salt or an organic lithium salt; lithium metal and lithium alloys can also be used as the lithium precursor. Non-salt lithium compounds comprising silicon can be used as the lithium precursor. Mixtures of any two or more lithium compounds, or mixtures from different types of lithium sources (e.g., a lithium alloy and a lithium compound) can be used as the lithium precursor.

Lithium metal and/or a lithium alloy (e.g., with silicon, magnesium, or aluminum) can be used as a lithium precursor, alone or in combination with one or more organic and/or inorganic lithium salts. When lithium metal and/or a lithium alloy is used, an inert atmosphere which excludes of water and oxygen is normally required; the inert atmosphere is preferably argon, as lithium metal and at least some lithium alloys are known to react with nitrogen. Also, when lithium metal and/or a lithium alloy is used, the solvent(s), carbon precursor compounds, and any lithium compounds are those that are mildly reactive, or preferably non-reactive, to lithium metal and/or a lithium alloy.

Mixtures of any two or more lithium salts can be used as the lithium precursor; when two or more lithium salts are used, the mixture can comprise one or more inorganic lithium salts and/or one or more organic lithium salts. Suitable inorganic lithium salts include lithium chloride, lithium bromide, lithium iodide, lithium chlorate, lithium carbonate, lithium bicarbonate, lithium nitrite, lithium nitrate, lithium sulfide, lithium sulfite, lithium sulfate, lithium phosphite, lithium phosphate, and lithium hydroxide. Hydrated forms of these salts, e.g., lithium hydroxide monohydrate, can be used. Suitable organic lithium salts include lithium acetate, lithium acetylacetate, lithium benzoate, lithium citrate, lithium formate, lithium oxalate, lithium salicylate, lithium tartrate, and polymers comprising lithium. Lithium hydroxide is a preferred inorganic lithium salt. When the lithium precursor includes an organic lithium salt and/or a polymer comprising lithium, some of the carbon in the lithium compounds may become part of the coating on the particle comprising silicon.

A wide variety of compounds comprising carbon can be used as carbon precursors in the practice of this invention. The carbon precursor can be dissolved, suspended, dispersed, slurried, or emulsified in the precursor mixture; preferably, the carbon precursor is dissolved or slurried, more preferably dissolved, in the precursor mixture. Mixtures of two or more carbon compounds can be used as the carbon precursor. The compounds that can be used as the carbon precursor can be hydrocarbons (contain only carbon and hydrogen), or organic compounds that contain one or more heteroatoms, for example oxygen and/or nitrogen. Preferred compounds comprising carbon have higher amounts of carbon relative to hydrogen, so aromatic compounds are preferred; also preferred are polymers, including polyolefins and heteroatom-containing polymers. In some embodiments, preferred compounds comprising carbon are dissolved, suspended, dispersed, slurried, or emulsified in the same solvent in which the lithium precursor is present. More preferably, the compounds comprising carbon are dissolved or slurried in the same solvent in which the lithium precursor is present.

Suitable compounds comprising carbon in the practice of this invention include pentane, hexane, 2-methylhexane, cyclopentane, cyclohexane, methylcyclohexane, heptane, 4-methylheptane, octane, cyclooctane, nonane, decane, benzene, toluene, xylene, ethylbenzene, amylbenzene, methylethylbenzene, diethylbenzene, mesitylene, 1,2,4-triethylbenzene, 1,3,5-triethylbenzene, amylbenzene, tetrahydronaphthalene, refinery heavy oil, pitch, polyethylene, polypropylene, polyacrylic acid, polymaleic acid, polyfumaric acid, polycrotonic acid, poly(pentenoic) acid, polymethacrylic acid, polydimethacrylic acid, poly(allyl alcohol), poly(n-propyl)acrylate, poly(hydroxymethyl)acrylate, poly(2-hydroxyethyl)acrylate, poly(2-carboxyethyl) acrylate, poly(3-ethoxy-3-oxopropyl)acrylate, poly(methylcarbamylethyl)acrylate, poly(2-hydroxyethyl)methacrylate, polyvinylpyrrolidone (PVP), polyacrylamide, polymethacrylamide, poly(N-isopropyl)acrylamide, polyvinylacetamide, polyvinyl alcohol, polyvinyl-N-methylacetamide, poly(N-hydroxymethyl)acrylamide, poly(N-hydroxyethyl) acrylamide, poly(N-methoxymethyl)acrylamide, poly(N-ethoxymethyl)acrylamide, polyacrylonitrile, sucrose, and natural polymers such as cellulose and polysaccharides. Polyacrylic acid and polyacrylonitrile are preferred compounds comprising carbon because they are soluble in polar solvents, including water.

The amount of the lithium precursor relative to the silicon oxide particles is such that the lithium:silicon atomic ratio is preferably about 0.03:1 or more, or in the range of about 0.03:1 to about 1:1, more preferably in the range of about 0.03:1 to about 0.5:1, more preferably about 0.03:1 to about 0.4:1.

The amount of the carbon precursor relative to the silicon oxide particles is such that the carbon:silicon atomic ratio is about 0.01:1 or more, preferably about 0.015:1 or more, or in the range of about 0.01:1 to about 4:1, preferably in the range of about 0.02:1 to about 3:1, more preferably about 0.02:1 to about 0.2:1. These amounts are selected assuming a carbon yield in the coated particles of about 20%, where carbon yield is the amount of carbon on the particle relative to the amount of carbon provided by the carbon precursor(s). For example, if the carbon precursor provides 100 grams of carbon, a 20% carbon yield is 20 grams of carbon.

The amount of the lithium precursor relative to the carbon precursor is such that the lithium:carbon atomic ratio is about 0.0015:1 or more, preferably about 0.015:1 or more, or in the range of about 0.0015:1 to about 100:1, preferably in the range of about 0.015:1 to about 75:1, more preferably in the range of about 0.03:1 to about 50:1.

The liquid medium can be any of a variety of solvents, or a mixture of two or more solvents, as long as the lithium precursor and the carbon precursor are dissolved, suspended, dispersed, slurried, or emulsified in the liquid medium; preferably, the lithium precursor and the carbon precursor are dissolved or slurried, more preferably dissolved, in the liquid medium. The lithium precursor and the carbon precursor may be in different states in the liquid medium; for example, the lithium precursor may be dissolved in the liquid medium, while the carbon precursor is suspended in the liquid medium. In some embodiments, the lithium precursor is in one or more solvents, whether dissolved, suspended, dispersed, slurried, or emulsified, and the carbon precursor is separately in one or more solvents, whether dissolved, suspended, dispersed, slurried, or emulsified, and the lithium precursor in its solvent(s) is combined with the carbon precursor in its solvent(s) to form the wetted mixture. In preferred embodiments, since the lithium precursor typically has at least some ionic character, a polar solvent is preferred. In some instances, the carbon precursor may have limited solubility in a polar solvent, and can be dissolved in a nonpolar solvent to form a solution of the carbon precursor, which solution is then combined with a solution of the lithium precursor to obtain the liquid medium comprising the carbon precursor and the lithium precursor. When the carbon precursor is dissolved in a nonpolar solvent, the nonpolar solvent preferably has some miscibility with the polar solvent in which the lithium precursor is dissolved. In a precursor mixture in which the lithium precursor and/or the carbon precursor are suspended, partially dissolved, slurried, emulsified, or dispersed, the coating formed from such precursor mixtures will be less uniform; however, such precursor mixtures may provide other advantages such as ease of transfer.

The polar solvent(s) can be protic or aprotic. Mixtures of polar solvents can be used, including mixtures comprising an aprotic solvent and a protic solvent. Suitable polar solvents that can be used in the practice of this invention include water, alcohols, esters, ketones, nitriles, and halogenated hydrocarbons. Suitable polar solvents include water, methanol, ethanol, n-propanol, 2-propanol, 1-butanol, 2-methyl-1-propanol, 1-methyl-1-propanol, cyclopropylmethanol, cyclobutanol, cyclopentanol, acetonitrile, propionitrile, hexanenitrile, benzonitrile, acetone, methyl ethyl ketone, pentanone, hexanone, heptanone, tetrahydrofuran, diethyl ether, di-n-propyl ether, diisopropyl ether, di-n-butyl ether, butyl ethyl ether, cyclohexylmethyl ether, tetrahydrofuran, tetrahydropyran, 1,3-dioxane, 1,4-dioxane, 1,3-dioxolane, ethylene glycol, diethylene glycol, ethyl acetate, isopropyl acetate, n-butyl acetate, isobutyl acetate, amyl acetate, hexyl acetate, methyl propionate, ethyl propionate, ethyl butyrate, ethyl benzoate, dichloromethane, dibromomethane, dibromoethane, trichloromethane, tribromomethane, 1,2-dichloroethane, chlorobenzene, bromobenzene, dimethylformamide, dimethylsulfoxide, and N-methyl pyrrolidinone. Preferably, the polar solvent is a protic solvent; more preferably, the polar solvent is water or an alcohol, such as ethanol or isopropyl alcohol. Water is a preferred polar solvent.

Nonpolar solvents include liquid aromatic hydrocarbons and liquid aliphatic hydrocarbons. Suitable liquid hydrocarbons in the practice of this invention include pentane, hexane, 2-methylhexane, cyclopentane, cyclohexane, methylcyclohexane, heptane, 4-methylheptane, octane, cyclooctane, nonane, decane, benzene, toluene, xylene(s), ethylbenzene, mesitylene, methylethylbenzene, diethylbenzene, cumene, cymene, and tetrahydronaphthalene.

When the liquid medium includes one or more carbon-containing solvents, some of the carbon in the carbon-containing solvent(s) may become part of the coating on the particle comprising silicon.

Generally, the amount of liquid medium in the (wetted) mixture, which is formed from the precursor mixture and the particles comprising silicon, is enough to form a paste or paste-like mixture. When the amount of liquid medium is more than enough to form a paste or paste-like mixture, the mixture and the coating formed therefrom may be less uniform. If the amount of liquid medium is more than enough to form a paste or paste-like mixture, the extra liquid medium can be removed. If the liquid medium from the precursor mixture is not enough to form a paste after combining the precursor mixture and particles comprising silicon, more solvent can be added.

The amount of liquid medium needed to wet the particles comprising silicon varies, depending on the viscosity of the liquid medium and the particle size of the particles comprising silicon. The liquid medium is preferably in an amount of about 0.2 mL or more per gram of the particles of one or more silicon oxides. In terms of ranges, the liquid medium is preferably about 0.2 mL/g to about 2 mL/g of particles comprising silicon, more preferably about 0.3 mL/g to about 1 mL/gram of particles comprising silicon, even more preferably about 0.4 mL/g to about 1 mL/gram of particles comprising silicon, still more preferably about 0.4 mL/g to about 0.75 mL/gram of particles comprising silicon.

The concentration of the lithium precursor in the liquid medium can be any convenient concentration, preferably, the concentration is chosen so that the lithium precursor is slurried or dissolved, more preferably dissolved, in the liquid medium. Very low concentrations, e.g., below about 1 wt %, are not desired because less of the lithium will become part of the coating. Typical concentrations of the lithium precursor in the liquid medium are about 2 wt % or more, or in the range of about 2 wt % to about 50 wt %; preferably about 2 wt % to about 35 wt %.

The concentration of the carbon precursor in the liquid medium can be any convenient concentration; preferably, the concentration is chosen so that the carbon precursor is slurried or dissolved, more preferably dissolved, in the liquid medium. Very low concentrations, e.g., below about 1 wt %, are not desired because less of the carbon will become part of the coating. For oligomers and polymers, typical concentrations of the carbon precursor in the liquid medium are about 3 wt % or more, or in the range of about 3 wt % to about 20 wt %, preferably about 3 wt % to about 15 wt %, more preferably about 3 wt % to about 12 wt %, even more preferably about 3 wt % to about 10 wt %. It has been found that the viscosity of the solution is a better variable for obtaining a good carbon-containing coating than the concentration of the carbon precursor in the liquid medium. The concentrations for oligomers and polymers provide solutions of desired viscosity. When the carbon precursor is not an oligomer or polymer, the concentration of the carbon precursor in the liquid medium is generally much higher than for oligomers and polymers to achieve similar viscosities. Preferred viscosities for a liquid medium comprising the lithium precursor and the carbon precursor are approximately equivalent to the viscosity of a liquid medium comprising lithium hydroxide at 8 wt % and poly(acrylic acid) at 12 wt %.

In the combining and mixing step, the precursor mixture is often added to the particles comprising silicon. Other ways of combining the particles comprising silicon and the precursor mixture, such as adding both at the same time to a vessel or adding the particles comprising silicon to the precursor mixture, can be employed.

For the mixing, the particles comprising silicon and the precursor mixture are mixed together until the particles comprising silicon are wetted, forming the wetted mixture. In preferred embodiments, the wetted mixture has a paste-like consistency. The mixing can be accomplished by any convenient means, such as a magnetic stirrer, overhead stirrer, or a shaker. The mixing step typically has a duration of a few minutes on the laboratory scale.

In the heating step, the wetted mixture is generally kept at the desired temperature or temperatures for about 1 to about 6 hours on the laboratory scale. Shorter heating times may be sufficient for some combinations of reagents; longer heating times may be needed for other combinations of reagents.

The temperature for the heating step is usually about 500° C. or more; more preferably about 600° C. or more; even more preferably about 700° C. or more; still more preferably about 800° C. or more. In terms of ranges, the heating step temperature is in the range of about 500° C. to about 1100° C., preferably in the range of about 550° C. to about 1100° C., more preferably in the range of about 600° C. to about 1000° C., and even more preferably in the range of about 600° C. to about 950° C. Under these conditions, silicon carbide does not form.

The amount of the lithium compound(s) in the mixture and the temperature in the heating step have been observed to affect the formation of lithium silicates.

One of the advantages of the present invention is that the heating step usually does not need to be performed under an inert atmosphere. However, conducting the heating step under an inert atmosphere is preferred. The inert atmosphere can be static or a flow of the inert gas or gases. As used throughout this document, "inert atmosphere" refers to an essentially oxygen-free gas or mixture of gases; adventitious amounts of oxygen may be present in the inert atmosphere. Water can be present in the inert atmosphere in the practice of this invention, unless lithium metal and/or a lithium alloy is employed. The inert atmosphere is normally argon, nitrogen, helium; mixtures of two or more inert gases can be used; nitrogen and argon are preferred. When the lithium precursor comprises lithium metal and/or one or more lithium alloys, the inert gas is preferably argon.

In some processes of this invention, instead of being part of the wetted mixture, a portion of the carbon precursor can be introduced by feeding into the wetted mixture, preferably during the heating of the wetted mixture. This portion of the carbon precursor is preferably fed into the wetted mixture in liquid or gaseous form, more preferably gaseous form. The gaseous form of a carbon precursor can be a carbon precursor that is in the gas phase at ambient conditions, and/or gaseous carbon precursor can be obtained by heating and/or by passing an inert gas over the surface of the carbon precursor.

Other processes of this invention for forming a composition comprising particles comprising silicon having thereon a coating comprised of carbon and one or more lithium silicates comprise A) combining and mixing particles comprising silicon and a precursor mixture comprising a liquid medium and a lithium precursor, to form a wetted mixture, and B) heating at least a portion of the wetted mixture while feeding a carbon precursor into the wetted mixture, to form the coating on the particles comprising silicon. The coated particles comprising silicon have a carbon content of about 0.10 wt % or more and a lithium content of about 1 wt % or more, relative to the total weight of the coated particle comprising silicon. In these processes, the particles comprising silicon, liquid medium, lithium precursor, carbon precursor, relative amounts of these substances, heating conditions, and preferences for all of these are as described above.

In these processes of the invention in which the carbon precursor is introduced by feeding into the wetted mixture, the carbon precursor is preferably fed into the wetted mixture in liquid or gaseous form, more preferably gaseous form. The gaseous form of a carbon precursor can be a carbon precursor that is in the gas phase at ambient conditions, and/or gaseous carbon precursor can be obtained by heating and/or by passing an inert gas over the surface of the carbon precursor.

For the processes of the invention in which the carbon precursor is introduced by feeding into the wetted mixture, at least a portion of the carbon precursor is preferably in the gas phase. In these embodiments, at least a portion of the carbon precursor can be a gas phase compound. Suitable gas phase carbon precursors include carbon dioxide, ethylene, acetylene, propylene, ethane, propane, cyclopropane, methylcyclopropane, butane, cyclobutane, and dimethyl ether.

Optionally, after the heating step of the processes of the invention, and preferably after cooling, the coated particles can be contacted and/or washed with one or more solvents to remove unreacted lithium precursors and/or unreacted carbon precursors, and to remove undesired by-products. The solvent(s) for contacting and/or washing can be the same as or different than the solvent(s) that formed the liquid medium during the process.

The coated particles comprising silicon formed in the processes of this invention have a carbon content of about 0.10 wt % or more and a lithium content of about 1 wt % or more, relative to the total weight of the coated particle. The average particle sizes, carbon content, lithium content, lithium silicates, and relative amount of lithium to carbon and the preferences therefor are as described above for the compositions of the invention.

The coated particles comprising silicon of this invention can be used as an anode (negative electrode) active material. In some embodiments, the coated particles comprising silicon are coated onto a current collector, sometimes in the form of a slurry comprising the coated particles comprising silicon. At least a portion of the coated current collector becomes at least part of an anode. An anode comprising coated particles comprising silicon of this invention as the active material can be used in a secondary battery, especially a lithium secondary battery. Secondary batteries are typically comprised of an anode, a cathode, a separator, and an electrolyte solution.

The following examples are presented for purposes of illustration, and are not intended to impose limitations on the scope of this invention.

In the Examples, lithium silicates present were determined by X-ray powder diffraction (XRD). The X-ray powder diffraction analyses were performed on a D8 ADVANCE powder diffractometer (Bruker Inc.) which used a CuKα anode as the X-ray source ($\lambda=1.54060$ Å). In the X-ray powder diffraction patterns of the inventive material (coated particles comprising silicon) in all of the Examples below, no peak at $2\theta=35.8\pm0.2°$ was found. A peak at $2\theta=35.8\pm0.2°$ corresponds to silicon carbide; it was concluded that no silicon carbide was formed in the inventive materials.

The total carbon content (TC), lithium content (ICP), and surface area ($N_2$ isotherm adsorption, also called Braun-Emmet-Teller or BET analysis) were also measured.

Example 1

A solution containing lithium hydroxide (12.3 wt %) and poly(acrylic acid) (6 wt %, PAA) was prepared by dissolving lithium hydroxide monohydrate ($LiOH \cdot H_2O$) and PAA in water. Silicon monoxide (4.0 g, SiO), with an average particle size of 5 μm, was weighed into a beaker. The solution of LiOH and PAA was added to the SiO in the beaker dropwise with stirring until all of the SiO particles appeared to be wetted. A total of 2.62 g of the LiOH+PAA solution was used, which corresponds to 0.322 g of LiOH and 0.157 g of PAA.

The wetted mixture was transferred into a stainless steel reactor, and then heated to 700° C. under a flow of argon gas and held at 700° C. for 3 hours. After the reactor was cooled down to room temperature, the treated material (coated particles comprising silicon) was removed from the reactor and analyzed. Three more runs were performed in this manner, varying the amounts, concentrations, and temperatures. The amounts, concentrations, and temperatures for all of the runs are summarized in Table 1A.

In the XRD pattern in FIG. 1, the x axis is $2\theta$ (coupled $2\theta/\theta$), and the y axis is the number of counts. The XRD pattern for Run A in FIG. 1 shows that the treated material contains $Li_2SiO_3$, with the peak at $2\theta=27°$ corresponding to the (111) plane of $Li_2SiO_3$. The peaks in FIG. 1 marked with solid diamonds are for $Li_2SiO_3$. Particle characteristics for all runs are summarized in Table 1B. Weight percent values reported in Table 1B are relative to the total weight of the coated particle.

TABLE 1A

| Ex. | Run | SiO | LiOH | PAA | LiOH conc. | PAA conc. | Temperature |
|---|---|---|---|---|---|---|---|
| 1 | A | 4.0 g | 0.322 g | 0.157 g | 12.3 wt % | 6 wt % | 700° C. |
| 1 | B | 4.5 g | 0.320 g | 0.156 g | 12 wt % | 6 wt % | 700° C. |
| 1 | C | 4.0 g | 0.417 g | 0.302 g | 12 wt % | 6 wt % | 900° C. |
| 1 | D | 8.0 g | 0.720 g | 0.479 g | 12 wt % | 8 wt % | 700° C. |

TABLE 1B

| Ex. | Run | Surface area | Silicate* | Total particle wt. (calculated) | Carbon | Li |
|---|---|---|---|---|---|---|
| 1 | A | 4.10 m²/g | $Li_2SiO_3$ | 4.22 g | 0.39 wt % | 2.0 wt % |
| 1 | B | 4.14 m²/g | $Li_2SiO_3$ | 4.72 g | 0.15 wt % | 2.2 wt % |
| 1 | C | 4.22 m²/g | $Li_2SiO_3$, Si, and $Li_2Si2O_5$ | 4.29 g | 0.44 wt % | 2.39 wt % |
| 1 | D | 4.18 m²/g | $Li_2SiO_3$ | 8.50 g | 0.83 wt % | 2.5 wt % |

*Si was identified by the peak at 2θ = 33.1° corresponding to the (111) plane of Si; $Li_2Si_2O_5$ was identified by the peak at 2θ = 24.7° corresponding to the (111) plane of $Li_2Si_2O_5$.

A comparison of the calculated Li content and the experimentally measured Li content are quite close, which indicates that very little or no lithium is lost in the preparation process.

Example 2

Additional preparations of coated particles comprising silicon were performed as described in Example 1; the reagents, amounts, and conditions are summarized in Table 2A. A portion of the product obtained in Run I, after cooling to room temperature, was heated to 900° C. and held at 900° C. for one hour and then cooled to room temperature to form the product of Run II. In Run IV, while heating the reactor to 900° C., an argon flow was bubbled through cyclohexane and total of 30 mL (23.1 g) of cyclohexane was introduced into the reactor.

Figure 2:
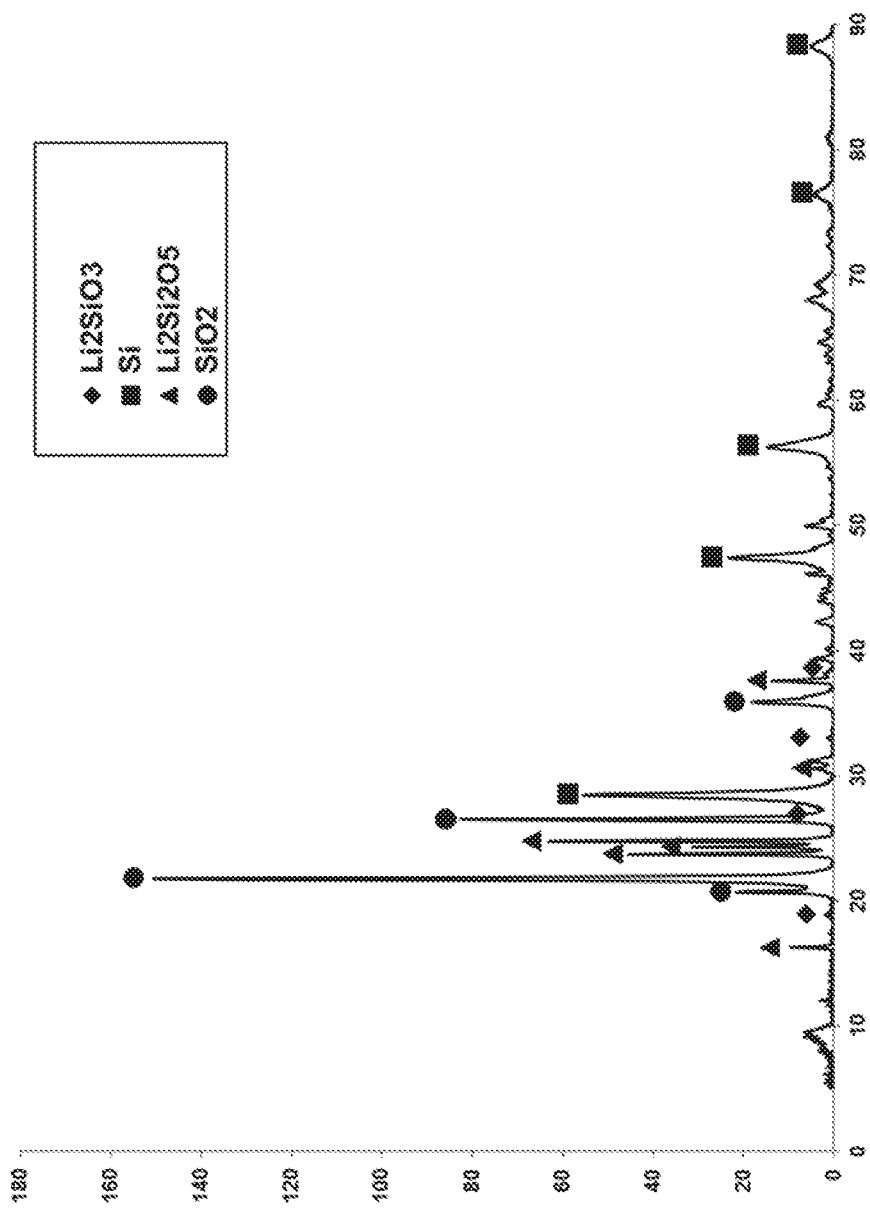
FIG. 2 is a powder XRD pattern for coated particles comprising silicon prepared as in Example 2.

In the XRD pattern for Run II in FIG. 2, the x axis is 2θ (coupled 2θ/θ), and the y axis is the number of counts. The XRD pattern for Run II in FIG. 2 shows that the treated material contains $Li_2SiO_3$, $Li_2Si_2O_5$ and Si, with the peak at 2θ=27° corresponding to the (111) plane of $Li_2SiO_3$; the peak at 2θ=24.7° corresponding to the (111) plane of $Li_2Si_2O_5$, and the peak at 2θ=33.1° corresponding to the (111) plane of Si. Particle characteristics for all runs are summarized in Table 2B below; weight percent values reported in Table 2B are relative to the total weight of the coated particle.

TABLE 2A

| Ex. | 2 | 2 | 2 | 2 | 2 |
|---|---|---|---|---|---|
| Run | I | II | III | IV | V |
| SiO | 20 g | 20 g | 20 g | 20 g | 20 g |
| Li precursor | LiOH 1.84 g 14.4 wt % | LiOH 1.84 g 14.4 wt % | LiOH 3.314 g 19.9 wt % | LiOH 0.729 g 7.3 wt % | $CH_3COOLi$ 6.5 g 30.9 wt % |
| Carbon precursor* | PAA 0.9015 g 7.0 wt % | PAA 0.9015 g 7.0 wt % | PAA 1.266 g 7.6 wt % | PVP 1.595 g 12.1 wt % | cyclohexane 30 mL — | PAA 1.348 g 6.4 wt % |
| Solvent | water | water | water | methanol | water |
| Temp. | 700° C. | 900° C. | 900° C. | 900° C. | 900° C. |

*PAA = poly(acrylic acid); PVP = polyvinylpyrrolidone.

TABLE 2B

| Ex. | Run | Silicate* | Total particle wt. (calculated) | Carbon | Li |
|---|---|---|---|---|---|
| 2 | I | $Li_2SiO_3$ | 21.24 g | 0.38 wt % | 2.5 wt % |
| 2 | II | $Li_2SiO_3$, Si, and $Li_2Si_2O_5$ | 21.24 g | 0.32 wt % | 2.5 wt % |
| 2 | III | $Li_2SiO_3$, Si, and $Li_2Si_2O_5$ | 22.19 g | 0.44 wt % | 4.33 wt % |

TABLE 2B-continued

| Ex. | Run | Silicate* | Total particle wt. (calculated) | Carbon | Li |
|---|---|---|---|---|---|
| 2 | IV | $Li_2SiO_3$, Si, and $Li_2Si_2O_5$ | 20.61 g | 1.32 wt % | 1.02 wt % |
| 2 | V | $Li_2SiO_3$, Si, and $Li_2Si_2O_5$ | 23.94 g | 1.85 wt % | 2.81 wt % |

*Si was identified by the peak at 2θ = 33.1° corresponding to the (111) plane of Si; $Li_2Si_2O_5$ was identified by the peak at 2θ = 24.7° corresponding to the (111) plane of $Li_2Si_2O_5$.

A portion of a coated particle comprising silicon from Run III, after cross-section polishing (CP), was examined by energy dispersive x-ray spectroscopy (EDX), which showed that the coating comprised the elements Si, 0, and C.

Example 3

A portion (1.0 g) of the coated particles comprising silicon from some of the runs in the above Examples were each made into a slurry with the following ingredients:

5 w % coated particles comprising silicon;
89 w % graphite;
1.5 wt % carboxymethyl cellulose (CMC);
3 wt % styrene-butadiene rubber (SBR);
1.5 wt % carbon black; and
water.

The amount of water was such that the solid content was about 60 wt % of the slurry. The slurry was coated onto a copper foil current collector and then the coating was dried and then calendared to 30% porosity, forming an electrode containing coated particles comprising silicon. The loading of coated particles comprising silicon on the electrode was about 8 mg/cm². Five coin cells were assembled from each calendared electrode, with lithium foil as the counter electrode and $LiPF_6$ (1 M) in ethylene carbonate/ethyl methyl carbonate (30:70 wt/wt) as the electrolyte solution. The cells were cycled at C/20 for 10 cycles. For comparison, both pristine SiO without any treatment and a graphite anode without SiO were also tested under the same conditions. The first cycle capacities and Coulombic efficiencies are summarized below in Table 3.

TABLE 3

| Ex. | Run | Lithiation capacity (1st cycle) | De-lithiation capacity (1st cycle) | Coulombic efficiency (1st cycle) |
|---|---|---|---|---|
| 3 | graphite anode* | 354 mAh/g | 327 mAh/g | 92.4% |
| 3 | SiO* | 460 mAh/g | 390 mAh/g | 84.4% |
| 2 | I | 402 mAh/g | 322 mAh/g | 82.6% |
| 2 | III | 361 mAh/g | 328 mAh/g | 90.9% |
| 2 | IV | 399 mAh/g | 364 mAh/g | 90.3% |

*Comparative run.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

The invention may comprise, consist, or consist essentially of the materials and/or procedures recited herein.

As used herein, the term "about" modifying the quantity of an ingredient in the compositions of the invention or employed in the methods of the invention refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term about also encompasses amounts that differ due to different equilibrium conditions for a composition resulting from a particular initial mixture. Whether or not modified by the term "about", the claims include equivalents to the quantities.

Except as may be expressly otherwise indicated, the article "a" or "an" if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation in its practice. Therefore the foregoing description is not intended to limit, and should not be construed as limiting, the invention to the particular exemplifications presented hereinabove.

The invention claimed is:

1. A composition comprising coated particles comprising silicon having a single coating comprised of carbon and one or more lithium silicates, the coated particles comprising silicon having a carbon content of about 0.10 wt % to about 10 wt % and a lithium content of about 1 wt % to about 15 wt %, relative to the total weight of the coated particles comprising silicon, wherein the single coating is formed from a wetted mixture comprising a liquid medium, a carbon precursor, and a lithium precursor, wherein lithium and carbon are in a lithium:carbon ratio of about 2:1 to about 50:1 by weight, and wherein the coated particles comprising silicon have an average particle size in the range of about 0.05 micron to about 25 microns.

2. An anode having an active material comprising coated particles comprising silicon as in claim 1.

3. A secondary battery comprising
an anode having an active material comprising coated particles comprising silicon as in claim 1,
a cathode,
a separator, and
an electrolyte solution.

* * * * *